US009778086B2

(12) United States Patent
Arai et al.

(10) Patent No.: US 9,778,086 B2
(45) Date of Patent: Oct. 3, 2017

(54) FLOW SENSOR WITH A HOUSING THAT ACCOMMODATES AN AUXILIARY CHANNEL HAVING AN OPENING INTO WHICH A FLUID TO BE MEASURED IS TAKEN

(75) Inventors: Satoshi Arai, Tokyo (JP); Shigeharu Tsunoda, Tokyo (JP); Keiji Hanzawa, Hitachinaka (JP); Shinobu Tashiro, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 217 days.

(21) Appl. No.: 14/407,763

(22) PCT Filed: Jun. 15, 2012

(86) PCT No.: PCT/JP2012/065398
§ 371 (c)(1),
(2), (4) Date: Dec. 12, 2014

(87) PCT Pub. No.: WO2013/186926
PCT Pub. Date: Dec. 19, 2013

(65) Prior Publication Data
US 2015/0192446 A1 Jul. 9, 2015

(51) Int. Cl.
*G01F 15/14* (2006.01)
*G01F 1/684* (2006.01)
(Continued)

(52) U.S. Cl.
CPC .......... *G01F 15/14* (2013.01); *B29C 65/1635* (2013.01); *B29C 65/7829* (2013.01);
(Continued)

(58) Field of Classification Search
CPC . B29C 66/11; B29C 65/1635; B29C 65/7829; B29C 66/242; B29C 66/32;
(Continued)

(56) References Cited

U.S. PATENT DOCUMENTS

2005/0077656 A1* 4/2005 Watanabe .......... B23K 26/0648
264/482
2005/0173055 A1* 8/2005 Okuda .............. B29C 66/73921
156/272.8
(Continued)

FOREIGN PATENT DOCUMENTS

JP 62-46621 A 2/1987
JP 2001-246488 A 9/2001
(Continued)

OTHER PUBLICATIONS

International Search Report (PCT/ISA/210) dated Aug. 28, 2012, with English translation (four (4) pages).

*Primary Examiner* — Harshad R Patel
*Assistant Examiner* — Brandi Hopkins
(74) *Attorney, Agent, or Firm* — Crowell & Moring LLP

(57) ABSTRACT

A flow sensor includes an auxiliary channel having an opening into which a fluid to be measured is taken; a sensor element that measures the flow of the fluid to be measured; a housing that accommodates electronic parts; and a resin cover. The flow sensor is configured such that junctions of the housing and the cover are formed in locations where first target weld portions, which are formed so that the circuit chamber is surrounded, face each other and second target weld portions, which are disposed for additional reinforcement of the joints, face each other on a bonding face of the housing and a bonding face of the cover with a step being provided. The positioning of the housing and the cover is determined, and the first target weld portions are welded to each other and second target weld portions are welded to each other by way of laser radiation.

15 Claims, 11 Drawing Sheets

(51) Int. Cl.
| | |
|---|---|
| *G01F 5/00* | (2006.01) |
| *G01F 15/00* | (2006.01) |
| *G01F 15/18* | (2006.01) |
| *B29C 65/00* | (2006.01) |
| *B32B 37/18* | (2006.01) |
| *B32B 38/00* | (2006.01) |
| *B29C 65/78* | (2006.01) |
| *B29L 31/34* | (2006.01) |
| *B29C 65/16* | (2006.01) |

(52) U.S. Cl.
CPC .......... *B29C 66/232* (2013.01); *B29C 66/322* (2013.01); *B29C 66/53461* (2013.01); *B29C 66/81267* (2013.01); *B32B 37/18* (2013.01); *B32B 38/0008* (2013.01); *G01F 1/6842* (2013.01); *G01F 1/6845* (2013.01); *G01F 5/00* (2013.01); *G01F 15/006* (2013.01); *G01F 15/185* (2013.01); *B29C 65/1612* (2013.01); *B29C 65/1616* (2013.01); *B29C 65/1677* (2013.01); *B29C 66/30223* (2013.01); *B29C 66/542* (2013.01); *B29C 66/71* (2013.01); *B29C 66/7352* (2013.01); *B29C 66/73772* (2013.01); *B29C 66/73776* (2013.01); *B29C 66/73921* (2013.01); *B29C 66/8122* (2013.01); *B29C 66/8322* (2013.01); *B29K 2995/0027* (2013.01); *B29L 2031/3481* (2013.01); *B32B 2457/00* (2013.01)

(58) Field of Classification Search
CPC ........ B29C 66/73161; B29C 66/73772; B29C 66/73774; B29C 65/02; B29C 65/08; B29C 66/71; B29C 66/81267; B29C 66/8122; G01F 1/684; G01F 1/68; G01F 1/696; G01F 1/692; G01F 1/6845; H01L 35/34; Y10T 29/49124; Y10T 29/49082
USPC ...... 73/273, 1.34, 202, 279, 861.08, 204.18, 73/204.11; 210/435, 446
See application file for complete search history.

(56) References Cited

U.S. PATENT DOCUMENTS

| | | |
|---|---|---|
| 2006/0191840 A1 | 8/2006 | Homi |
| 2011/0088464 A1* | 4/2011 | Ariyoshi ............... G01F 1/6842 73/204.27 |
| 2011/0296904 A1* | 12/2011 | Tagawa ................. G01F 1/684 73/114.32 |

FOREIGN PATENT DOCUMENTS

| | | |
|---|---|---|
| JP | 2002-318146 A | 10/2002 |
| JP | 2005-246692 A | 9/2005 |
| JP | 2005-246913 A | 9/2005 |
| JP | 2006-73296 A | 3/2006 |
| JP | 2006-231875 A | 9/2006 |
| JP | 2010-162587 A | 7/2010 |
| JP | 2010-201695 A | 9/2010 |

* cited by examiner

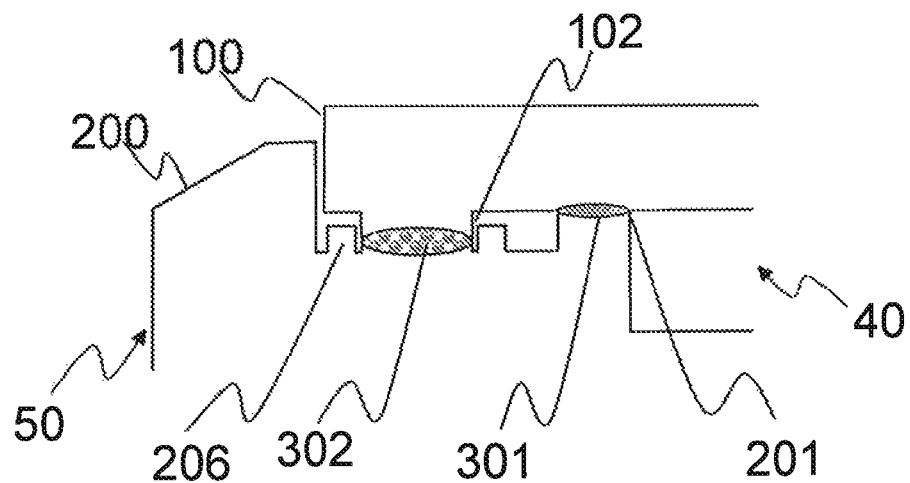
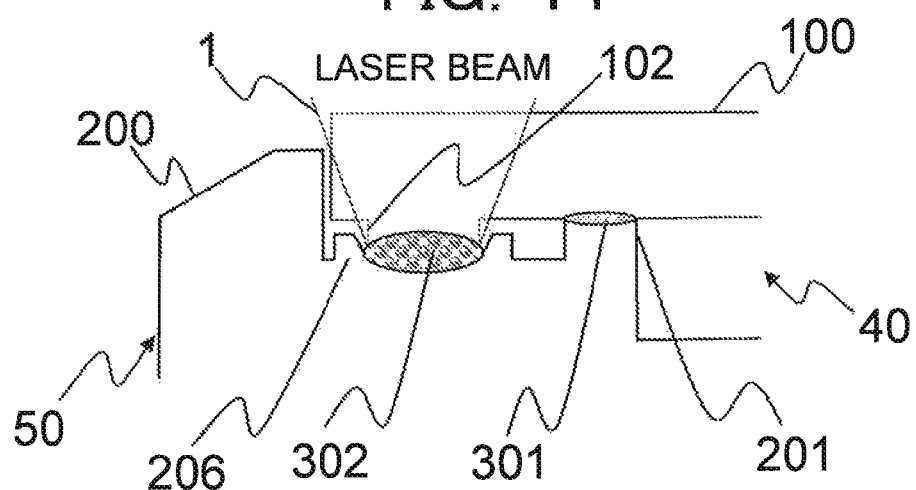
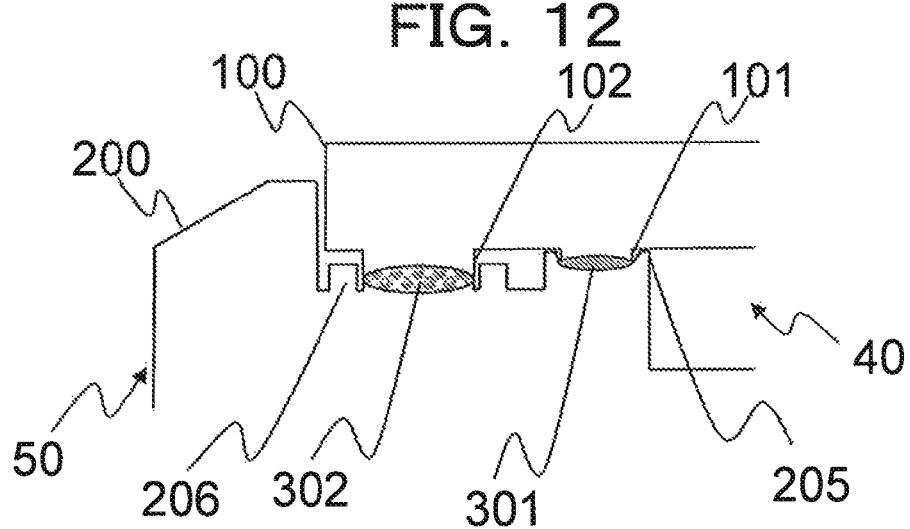

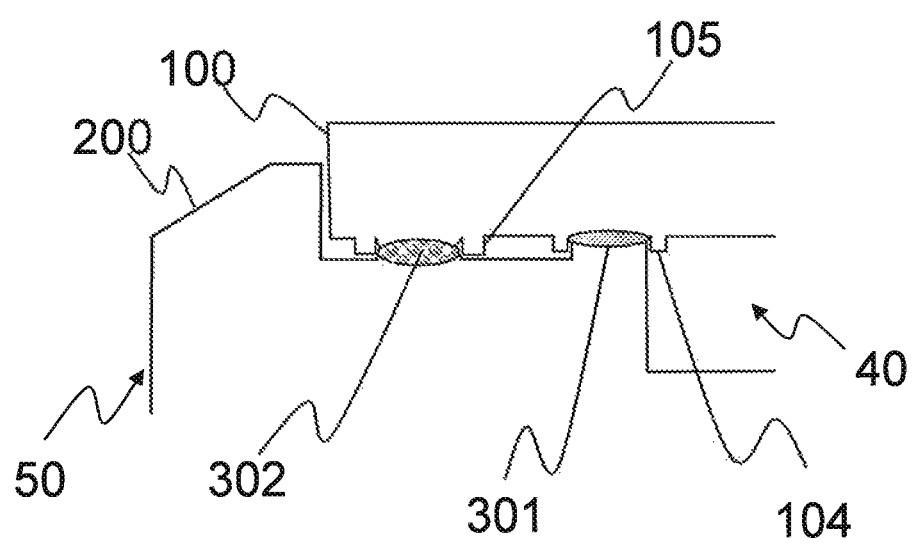

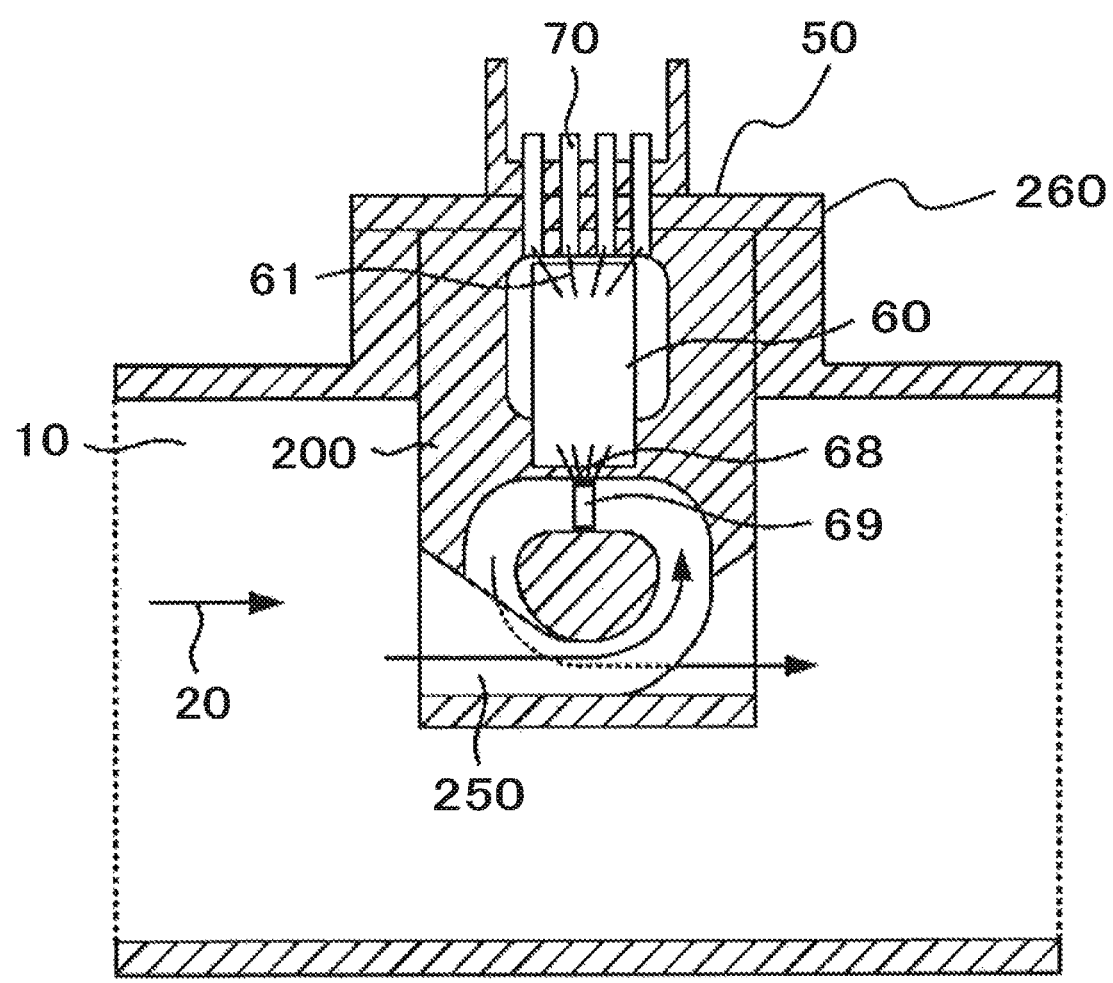

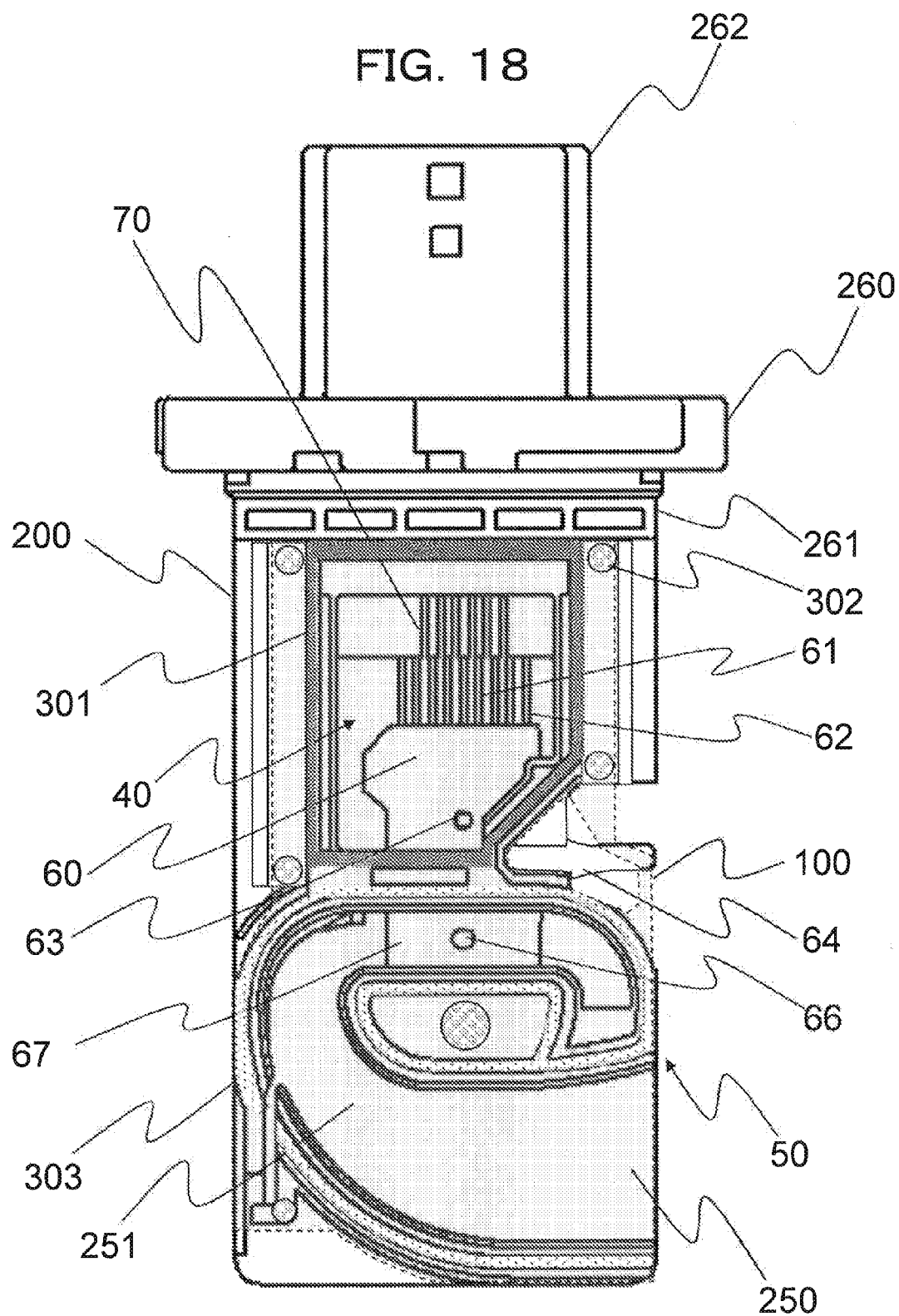

FLOW SENSOR WITH A HOUSING THAT ACCOMMODATES AN AUXILIARY CHANNEL HAVING AN OPENING INTO WHICH A FLUID TO BE MEASURED IS TAKEN

TECHNICAL FIELD

The present invention relates to flow sensors and the manufacturing method for such sensors and also pertains to a bonding structure between plastics employing laser-welding and the laser-welding method thereof.

BACKGROUND ART

On the background of the relevant technical field, there is Japanese Patent Application Laid-Open No. 2005-246692 (hereinafter, referred to as Patent Literature 1), in which there is disclosure that upon plastics being laser-welded, laser beam scan on the weld line is performed at the junctions two times or more and the laser beam scan on such weld line may well be performed on different peripheries.

In Japanese Patent Application Laid-Open. No. 2005-246913 (hereinafter referred to as Patent Literature 2), there is disclosure that resins are preliminarily welded to each other with two laser beams respectively scanned on two weld lines spaced apart from each other with a predetermined interval between them; and the resins are welded to each other in the end with the intermediary between those two weld lines welded.

In Japanese Patent Application Laid-Open No. 2006-73296 (hereinafter referred to as Patent Literature 3), there is disclosure on the laser-welded structure between a housing and a lens which is provided with the first welded section where the whole circumference of the housing and the lens respectively is laser-welded and the second welded section where the whole circumference of them respectively is laser-welded at the outer circumference of the first welded section and on the laser welding method thereof.

In Japanese Patent Application Laid-Open No. 2010-162587 (hereinafter referred to as Patent Literature 4), there is disclosure with regard to electronic equipment and flow meters that upon the other components besides their circuit substrates and so forth being fixed in position with thermal welding methods including laser welding method in use, an insulating section is provided on a channel holding body in order to restrain their circuit substrates and so forth from being thermally affected.

In Japanese Patent Application Laid-Open No. 2010-201695 (hereinafter referred to as Patent Literature 5), there is disclosure on the laser welding method comprising the steps of preliminarily forming a welded section with the resins overlapped with each other; and irradiating again laser beam onto the vicinity of such welded section so as to make the resins attached with each other, thereby the resins being welded to each other in the end.

CITATION LIST

Patent Literature

PTL 1: Japanese Patent Application Laid-Open No. 2005-246692
PTL 2: Japanese Patent Application Laid-Open No. 2005-246913
PTL 3: Japanese Patent Application Laid-Open No. 2006-73296
PTL 4: Japanese Patent Application Laid-Open No. 2010-162587
PTL 5: Japanese Patent Application Laid-Open No. 2010-201695

SUMMARY OF INVENTION

Technical Problem

At present, an electronically controlled fuel injector is provided in an internal combustion engine of vehicles and as such. This electronically controlled fuel injector plays the role of efficiently operating the internal combustion engine by adjusting the gas (air) flowing into such engine and the quantity of the fuel supplied thereto in an appropriate manner.

Therefore, it is required that the flow rate of the gas (air) flowing into the internal combustion engine be correctly grasped at the electronically controlled fuel injector. Thus, flow sensors (air flow sensors) to measure the flow rate of the gas (air) are provided in the electronically controlled fuel injector. Such flow sensors are provided with flow rate detection and temperature detection sections and are disposed on the housing (casing). Further, various electronic parts are packaged within the circuit chamber in the housing so that air-tightness against the atmospheric air is must in order to prevent short-circuits and corrosion of the wirings from occurring. For this reason, conventionally, in order to secure air-tightness, the housing and the cover have been sealed and fixed to each other with the plurality of adhesives in use. As for such adhesives, there are a lot of curable types, but in view of the reliability with which they are used for vehicles and as such, thermosetting adhesives are mostly utilized.

However, the main problem with such thermosetting adhesives lies in the fact that they require ten minutes or longer to be thermally cured so that productivity deteriorates. Further, another problem with using a lot amount of adhesives for the sealing invites increasing production cost. Further, unnecessary surface areas are required for the housing and the cover in order to minimize the phenomenon that adhesives are exuded from the junctions so that the latitude with which they are designed is limited. On top of that, another problem lies in the difficulty with which the amount of adhesives proper enough to seal the electronic parts is controlled. To address such problems, a laser welding method is exemplified by which the cover and the housing can be directly jointed to each other in a precise manner without doing damage on electronic parts.

The main problem with the prior invention disclosed in Patent Literature 1 lies in productivity owing to the fact that laser beam scan is performed on the portions to be jointed two times or more and in the recent finding that the welding width enlarges owing to the fact that laser beam is irradiated twice so as to readily generate burrs. The main problem with the prior invention disclosed in Patent Literature 2 lies in productivity from the same reason as noted in Patent Literature 1 owing to the fact that two laser beams are respectively scanned on two weld lines and in the fact that the unit to irradiate such two laser beams is expensive so that the equipment-related cost remarkably increases. The problem with the prior invention disclosed in Patent Literature 3 lies in productivity from the same reason as noted in Patent Literature 1.

The problem with the prior invention disclosed in Patent Literature 4 lies in the fact that although there is disclosure therein on an insulating section being provided on a channel holding body, but it is out of the question because when the laser welding method is applied, the thermally fused region is limited only to the vicinity of the laser radiation range so that there is no possibility that the electronic parts might be badly affected. The problem with the prior invention disclosed in Patent Literature 5 lies in the fact that there is disclosure therein on performing preliminary welding and then performing final welding in the vicinity of the preliminary welded section, but where the gap between the resins, at which gap a preliminary welded section is formed when the resins are pressed, is narrow, forming such preliminary welded section more vulnerably invites deterioration of quality and reliability. The prior invention disclosed in Patent Literature 5 corresponds to a modified example of Patent Literature 1, which also corresponds to those of Patent Literature 2 and 3.

Thus, the present invention is to provide a laser-welded structure between a cover and a housing and the laser welding method to realize improvement on productivity of flow sensors and enhancement of their quality and reliability as well as lowering of their production cost.

Solution to Problem

In order to address the above problem, the flow sensor comprising a housing that accommodates an auxiliary channel having an opening into which a fluid to be measured is taken, a sensor element that is disposed in the auxiliary channel and that measures the flow rate of the fluid to be measured and electronic parts that are isolated from the auxiliary channel in a circuit chamber and drive and detect the sensor element; and a resin cover that is joined to the housing and that seals the circuit chamber in an air-tight manner from the atmospheric air is characterized in that junctions of the housing and the cover are formed in locations where first target weld portions of the first welded section, which is formed so that the circuit chamber is surrounded, face each other and second target weld portions of the second welded section, which is additionally disposed for reinforcement of joints, face each other on a bonding surface of the housing and a bonding surface of the cover respectively with a step provided such that a gap between the second target weld portions is larger than a gap between the first target weld portions; and the housing and the cover are set in position, thereby the first target weld portions and the second target weld portions being welded to each other by way of laser radiation.

Further, in order to address the above problem, the flow sensor according to the present invention is characterized in that the first welded section formed by welding the first target weld portions to each other is formed such that it surrounds a periphery of the circuit chamber and the second welded section formed by welding the second target weld portions to each other is formed in at least two spots such that the second welded sections interpose the circuit chamber.

Moreover, in order to address the above problem, the flow sensor according to the present invention is characterized in that a projection to form one of the first and second target weld portions is provided or projections to form the first and second target weld portions are provided in one of the cover and the housing.

In addition, in order to address the above problem, the flow sensor according to the present invention is characterized in that a concave portion is formed on the target weld portions of one of the cover and the housing and the junctions of the cover and the housing are formed with laser radiation applied to at least some of the target weld portions with mounted to each other.

Furthermore, in order to address the above problem, the manufacturing method of a flow sensor according to the present invention is characterized in comprising the steps of forming junctions of a housing, which accommodates an auxiliary channel having an opening into which a fluid to be measured is taken, a sensor element that is disposed in the auxiliary channel and that measures the flow of the fluid to be measured and electronic parts that are isolated from the auxiliary channel in a circuit chamber and drive and detect the sensor element, and a resin cover in locations where first target weld portions of the first welded section, which is formed so that the circuit chamber is surrounded, face each other and second target weld portions of the second welded section, which is additionally disposed for reinforcement of joints, face each other on a bonding surface of the housing and a bonding surface of the cover respectively with a step provided such that a gap between the second target weld portions is larger than a gap between the first target weld portions when the cover and the housing are set in position; setting the housing accommodating each of the parts and the cover in position and pressing the housing and the cover; and applying laser radiation from above the cover to the second welded section to make an interval between the second target weld portions welded to each other and then applying laser radiation from above the cover to the first welded section to make an interval between the first target weld portions welded to each other so as to join the cover to the housing.

Advantageous Effects of Invention

The present invention allows the leakage caused by the peeling-off of the welded sections required to seal the periphery of the circuit chamber to be restrained, so that a flow sensor excellent in quality and reliability is provided and permits a transparent press member which requires maintenance and replacement to be dispensed with, so that it remarkably contributes to lowering production cost.

BRIEF DESCRIPTION OF DRAWINGS

FIG. 10 is another example showing the welded shapes in the periphery of a circuit chamber between the housing and the cover of a flow sensor embodied in the present invention.

FIG. 11 is another example showing the welded shapes in the periphery of a circuit chamber between the housing and the cover of a flow sensor embodied in the present invention.

FIG. 12 is another example showing the welded shapes in the periphery of a circuit chamber between the housing and the cover of a flow sensor embodied in the present invention.

FIG. 13 is another example showing the welded shapes in the periphery of a circuit chamber between the housing and the cover of a flow sensor embodied in the present invention.

FIG. 14 is a view showing an example in which a flow sensor embodied in the present invention is packaged in an intake pipe of an internal combustion engine of vehicles and as such.

FIG. 18 is a backside view of the entire flow sensor embodied in the present invention when the laser welding method is applied.

DESCRIPTION OF EMBODIMENTS

Figure 17:
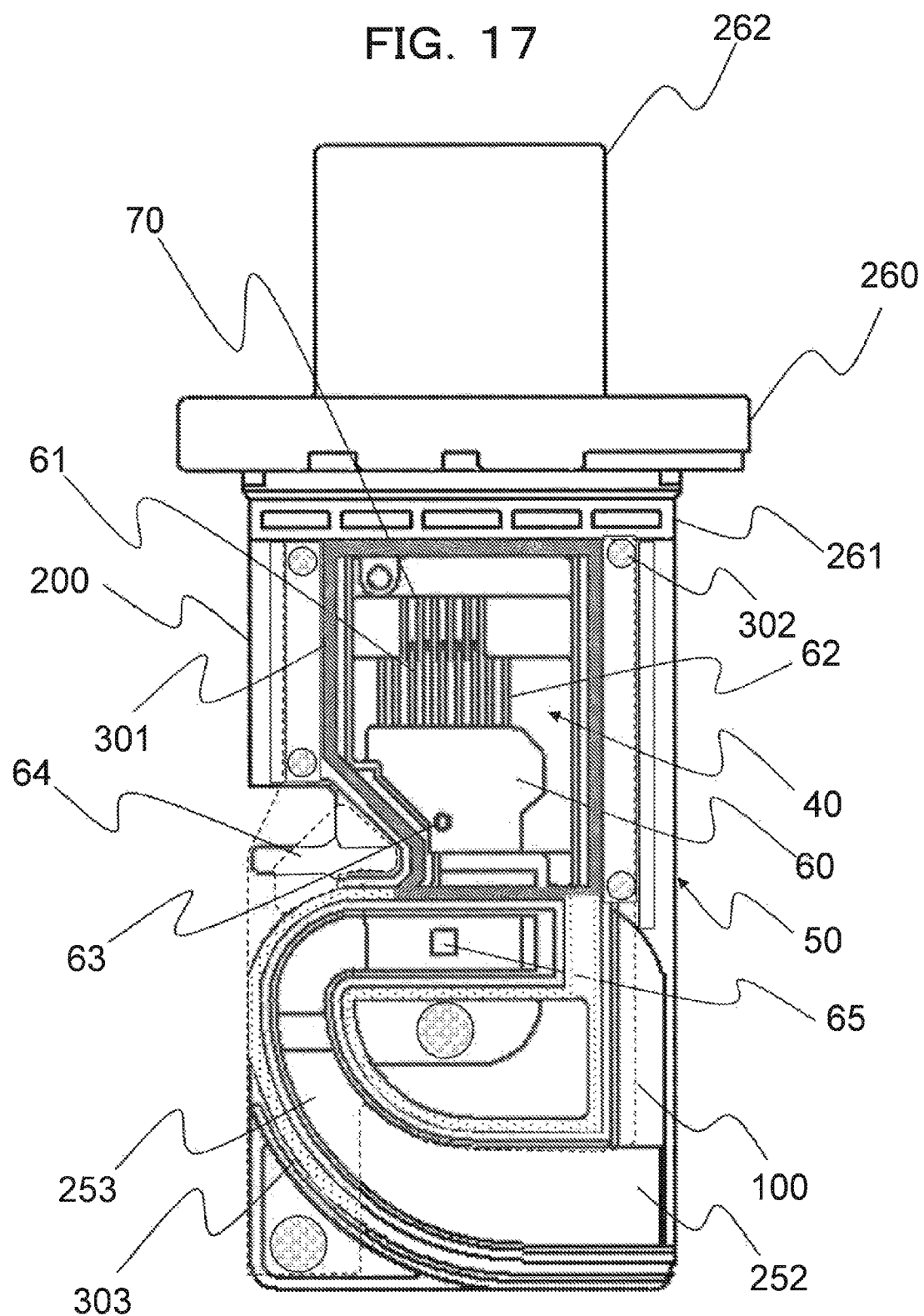
FIG. 17 is a frontal view of the entire flow sensor embodied in the present invention when the laser welding method is applied.

The preferred embodiments for carrying out the present invention are explained below. In FIGS. 17 and 18, the internal frontal and backside views of a flow sensor with its cover (whose outer configuration is shown with a broken line) removed therefrom according to one embodiment of the present invention are shown.

An example, in which a flow sensor 50 embodied herein is packaged in an intake pipe of an internal combustion engine of vehicles and as such, is shown in FIG. 14. In FIG. 14, a housing 200 is provided such that it protrudes from the wall surface of an intake pipe line 10. In the housing 200, an auxiliary channel 250 to partly take in an intake air 20 flowing through the intake pipe line 10 is formed. The auxiliary channel 250 has an opening into which the intake air 20 is introduced and out of which the same is discharged, in the vicinity of which opening a throttle whose passage area is gradually narrowed is provided. Further, the auxiliary channel 250 is provided with a curved section, through which curved section the intake air 20 introduced into the auxiliary channel 250 is turned back so that it structurally has a portion in its passage where the air flows reversely against the direction to which the intake air 20 flows. A flow sensor element 69 is disposed in such portion.

In the housing 200 of the flow sensor 50, a circuit package 60, in which the drive and detect circuit of the flow sensor element 69 is incorporated, is provided, and the flow sensor element 65 is electrically connected to the circuit package 60 through an Au bonding wire 68. In the same way, an external terminal 70 is connected to the circuit package 60 through a wire 61.

The above-mentioned circuit package 60, as shown in FIGS. 17 and 18, is disposed in a circuit chamber 40 provided in the housing 200 of the flow sensor 50. The air-tightness of the circuit chamber from the atmospheric air is secured by welding a cover not shown in the drawings (whose outer configuration is shown with a broken line) to the housing 200 by laser welding method. The most characteristic point of the present invention lies in such laser welding method.

For the materials of the housing and the cover of a flow sensor according to the present example, such crystalline resins high in heat resistance are mostly adopted as Polybutylene Terephtalate (PBT), Polyphenylene Sulfide (PPS), nylon 6 (PA6), nylon 66 (PA66), nylon 6T (PA6T). However, the present invention is also applicable to usage other than for a flow sensor and can cope with the laser welding of thermoplastic resins in general. For amorphous resins among such thermoplastic resins, polystyrene (PS), acrylonitrilestylene (AS), acrylonitril butadiene styrene (ABS) copolymer, polyetherimide (PEI), polycarbonate (PC), polyarylate (PAR), poly methyl methacrylate (PMMA), cycloolefinpolymer (COP), cycloolefincopolymer (COC), polysulfone (PSF), polyethersulfone (PES), polyvinylchloride (PVC) and polyvinyldenchloride (PVDC) are exemplified herein. For such crystalline resins, other than those mentioned above, polyethylene (PE), polypropylene (PP), polyoxymethylene (POM), polyethyleneterephtalate (PET), polytrimethyleneterephtalate (PTT), polyethylenenaphtalate (PEN), polyetheretherketone (PEEK), Liquid Crystal Polymer (LCP) and polytetrafluoroethylene (PTFE) are exemplified herein.

The present invention is also applicable to polymer alloys made from the above-mentioned resins and inorganic substances such as glass fibers as well as thermoplastic resins containing peculiar additives.

Generally speaking, amorphous resins are excellent in moldability and transparency while crystalline resins are excellent in heat resistance and chemical resistance. Moreover, the present invention is applicable not only to thermoplastic resins, but also to such thermosetting resins as epoxy based resins.

The laser welding method comprises the steps of applying laser radiation through a light transmitting resin with the light transmitting resin and a light absorbing resin overlapped with each other so as to make the other light absorbing resin welded; then welding the light transmitting resin inclusive, thereby the light transmitting resin and the light absorbing resin being joined to each other. Thus, it is preferred that the material for the cover adopted for such light transmitting resin be a purely natural material having a property and a thickness of transmitting laser beam by 20% or more. On the other hand, it is preferred that the material for the housing adopted for such light absorbing resin be a material containing carbon black so that it is blackened in color. Further, as with the flow sensor according to the present invention, a high precision and stability in dimension is especially required for the housing. Thus, it is often arranged such that glass fibers in the order of 20 to 40% in content are added to the resins from which the housing and the cover are made. However, adding such glass fibers tends to deteriorate the transmittancy of laser beam. In view of the foregoing, it is preferred that the percentage by which glass fibers are added to the thermoplastic resin adopted for the housing be larger than or equal to that by which they are added to the thermoplastic resin adopted for the cover. Further, as with the crystalline thermoplastic resins, it is observed that the lower the mold temperature during molding is, the less its degree of crystallinity is and the higher its transmittance is. Therefore, it is preferred that the degree of crystallinity of the thermoplastic resin adopted for the housing be larger than or equal to that of the thermoplastic resin adopted for the cover.

As for the light beam sources to be adopted for the laser welding, lasers having wavelengths in the infrared region is effective in the aspect of cost, which includes a semiconductor laser, a YAG laser and a fiber laser, but lasers having the other wavelengths may well be adopted according to the absorptivity of the resins in use. Further, the intensity distribution of the laser beam source can be modified into various manners such as Gaussian distribution, top hat type and ring type distributions according to the lenses attached to the lasers, but using the top hat type and ring type distributions are more favorable in view of uniform welding.

Further, the resins may well be welded by laser radiation to each other with the laser beam source or the stage set in motion or welded to each other by laser radiation with high speed with galvano mirrors in use.

EXAMPLE 1

Figure 1:
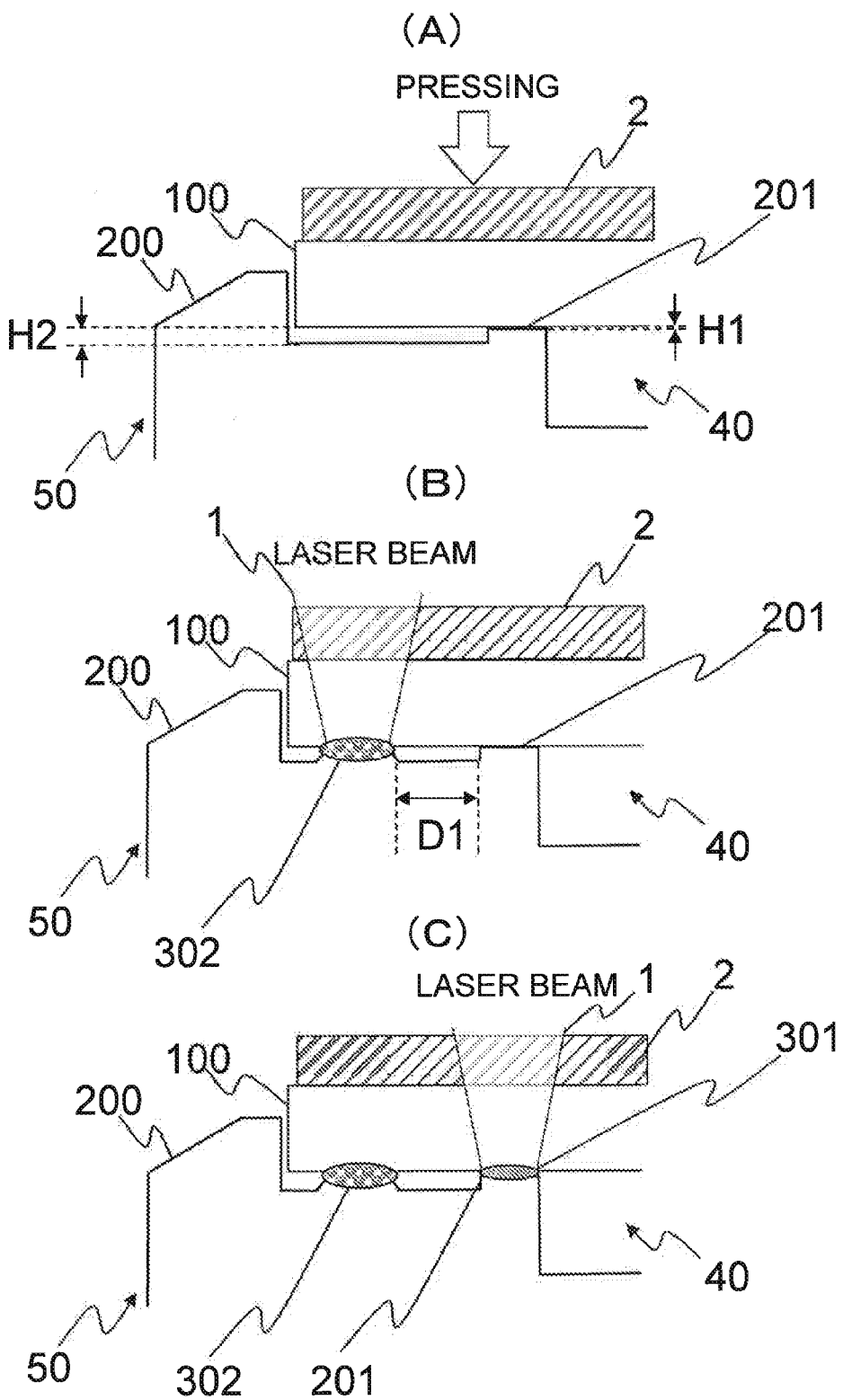
FIG. 1 is an example showing the welded shapes in the periphery of a circuit chamber between the housing and the cover of a flow sensor embodied in the present invention and the manufacturing processes thereof.

FIG. 1 exemplifies a flow sensor and the manufacturing method thereof according to the present example, in which the cross-sectional configurations of the junctions between the housing 200 and the cover 100 in the periphery of the circuit chamber 40 of the flow sensor 50 are shown. In the present example, it is characterized in that laser welding is performed with an gap H2 between the cover and the housing where a second welded section 302 is formed made larger than an gap H1 between a convex portion 201 of the housing 200 which is adopted for sealing the circuit chamber 40 and the cover 100 where a first welded section 301 is formed, in which the second welded portion is disposed outside the first welded portion. The concrete bonding method according to the present example is explained as follows.

In the first place, the cover 100 and the housing 200 are pressed with a transparent press member 2 made from glass or acrylic resin and so forth. To note, it is preferred that the pressure applied thereto be 0.1 Mpa or larger. Then, under the condition that the gap H2 between the cover 100 and the housing 200 disposed outside the first gap H1 on the side of the circuit chamber 40 between the cover 100 and the convex portion 201 of the housing 200 is made larger than the gap H1 (the cover and the housing are designed and prepared such that a predetermined difference arises between them when they are set in position), the portion corresponding to the gap H2 is welded by laser radiation. Thereafter, likewise, the portion corresponding to the gap H1 is welded by laser radiation with the cover and the housing pressed with the press member 2.

Hereupon, the reasons behind the finding of such structure and manufacturing method as mentioned above are explained as follows. The housing 200 made from a PET resin and as such is normally prepared by injection molding, in which according to the contraction of the work in process during molding sink marks and warps occur on the housing 200. In particular, with the flow sensor 50 according to the present example, the housing 200 has an especially complicated structure, so that when the housing is prepared with a mold arranged such that the sealing portion of the housing is at the same height level as the welded portion disposed outside the sealing portion, there occur more sink marks on the convex portion 201 on the side of the circuit chamber 40 than on an outer weld target stepped portion 202, with the result that there are some cases where the outer weld target stepped portion 202 might be higher than the convex portion 201 on the side of the circuit chamber 40 after the molding. Consequently, there occurs interference at the outer weld target stepped portion at the positioning and pressing stages of the cover and the housing so that there occurs a large gap between the convex portion 201 on the side of the circuit chamber 40 formed on the housing 200 and the cover 100, with the result that the air-tight condition after laser welding operation is aggravated.

Further, even when the convex portion 201 is substantially as high as the weld target stepped portion 202 after the molding operation, there simultaneously occur warps, so that it often happens that the gap between the cover and the housing at the outer weld target stepped portion is narrowed at their pressing stage. Further, in particular, when a PBT resin by way of one example is adopted for the material of the cover 100 and the housing 200, there are some cases where annealing operation is performed for the housing 200 in order to release residual stress, but there occur warps thereon after the annealing operation, so that it often happens that the gap between the cover and the housing at the outer weld target stepped portion is narrowed at the pressing stage in the same way as mentioned above.

Under such background, the present inventors have examined in details an influence caused by any gap arisen between the cover and the housing on the welding conditions and strength. For instance, when it is assumed that a gap distance between the PET resins is 0, a laser power at which the welding strength can be optimized is defined as A. Then, when such gap distance is increased and laser welding is performed at such laser power A, it has been found that the laser welding strength does not lower up to a certain gap distance and there occurs no air bubble (void) according to the thermal decomposition of the resins. Moreover, when such gap distance enlarges, it has been found that the welding strength gradually lowers and the percentage by which the air bubbles (voids) are remained rises. On the other hand, when the laser power is increased compared with A, it has been newly found that the degree to which the welding strength lowers is abated against the increased gap distance. However, there is tendency that the percentage by which the air bubbles (voids) are remained increases when the laser power is increased. It has been newly found that this is because the higher the laser power is, the higher the temperature of the light absorbing resin becomes, so that the adhesion of the resin has improved through its thermal expansion and decomposition. In this case, although the above explanation is given only with the laser power as a simplified model case, the same effect as mentioned above is also brought by slowing the scanning speed or augmenting heat input as required.

It is known that when air bubbles (voids) are remained, there locally occur minute peel-offs during the long period of commissioning and the interconnection of such peel-offs causes leakage to happen. On the other hand, characteristically speaking, it has been found that the generation of air bubbles to a certain degree does not lead to lowering the welding strength to a great degree.

As with the flow sensor 50, various electronic parts are packaged within the circuit chamber 40 in the housing 200 so that air-tightness is must in order to prevent short-circuits and corrosion of the wirings from occurring. Air-tightness referred to herein is intended to seal the circuit chamber against the corrosive gas and so forth contained in gasoline and the like, so that there are some cases where a ventilation hole is provided through the housing 200 to which connectors are coupled, the surrounding area of which hole is not completely rendered air-tight. In this case, only the atmospheric air results in being taken in through such hole, but it does not matter because it does not corrosively or in any other ways affect such parts.

Based on the above observations, it has been concluded that under the condition that the cover 100 and the housing 200 are designed and prepared such that the gap H2 between the cover 100 and the weld target stepped portion 202 of the housing 200 disposed outside the gap H1 between the cover 100 on the side of the circuit chamber 40 and the convex portion 201 of the housing 200 is made larger than the gap H1, the portion corresponding to the gap H2 is welded by laser radiation. In this case, the percentage by which air bubbles (voids) are remained in the first welded section 301 results in being smaller than that in the second welded section 302. To note, at this time, it is preferred that the cover 100 and the housing 200 be designed such that the gap H1 is 0 μm and the gap H2 is 50 μm on the mold, but such gaps are not limited to such numeric values, but may well be set according to the contraction of the molded housing 200. As for the actually prepared housing 200, it has been found in the process of the above examination that the gap H1 has a permissible range up to 75 μm and the gap H2 has a permissible range up to 150 μm.

The above arrangement allows no air bubble to be remained in the first welded section 301 and air-tightness to be secured there. Further, in the case where there is only the first welded section 301, the longstanding warps of the housing 200 and stress concentration on the housing corresponding to difference of linear expansion coefficient are applied only to such welded section, but forming the second welded section 302 allowing welding strength to be secured permits stress concentration on the first welded section 301 to be avoided. To note, in the case of the structure according to the present example, for the purpose that stress concentration on the first welded section 301 is restrained, it is preferred that the second welded section 302 be disposed outside the first welded section 301 as apart as possible. Forming the second welded section 302 contributes to improving on the welding strength as a whole so that the structure according to the present example is excellent also in shock resistance.

Accordingly, adopting the structure according to the present example permits air-tightness to be secured by the first welded section 301 while welding strength and reliability to be enhanced by the second welded section 302. To note, as with laser welding, the regions extremely in the vicinity of the joined welded sections are thermally fused. Thus, it is preferred that the distance D1 between the first welded section 301 and the second welded section 302 be 500 μm or longer. Further, with reference to FIG. 1, the explanation is given above in which laser welding is firstly performed on the outer gap H2 before being performed on the gap H1 to seal the circuit chamber 40, but laser radiation may well be applied to the outer gap H2 after it is applied to the gap H1 to seal the circuit chamber 40.

Figure 2:
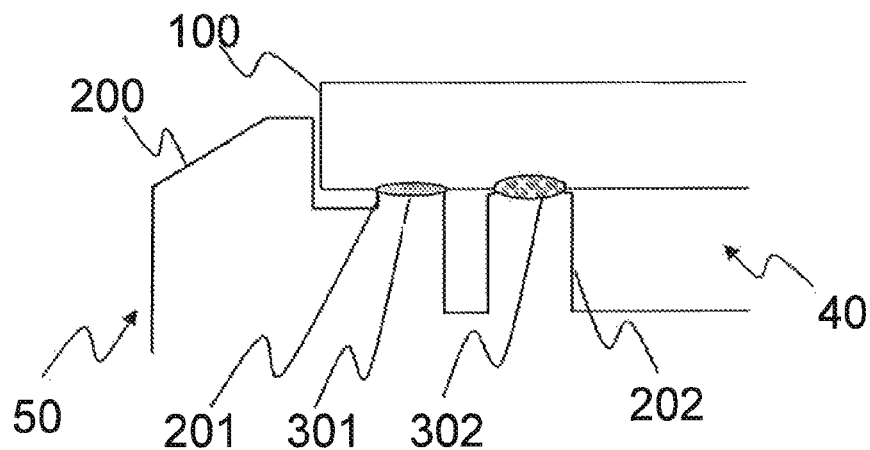
FIG. 2 is another example showing the welded shapes in the periphery of a circuit chamber between the housing and the cover of a flow sensor embodied in the present invention.

In this example, the structure in which the second welded section 302 not requiring air-tightness is disposed outside the first welded section 301 to seal the circuit chamber 40 is illustrated, but in the case where there is physical restriction in the aspect of design, the second welded section 302 having a larger gap and requiring no air-tightness or in which the percentage by which air bubbles (voids) are remained is high may well be provided in the circuit chamber 40 as shown in FIG. 2. Further, when productivity and design tolerance permit, the second welded section is not only provided either outside or inside the first welded section 301 to seal the circuit chamber 40, but also may well be provided both outside and inside the same. It is of course that this arrangement further improves on reliability.

Figure 3:
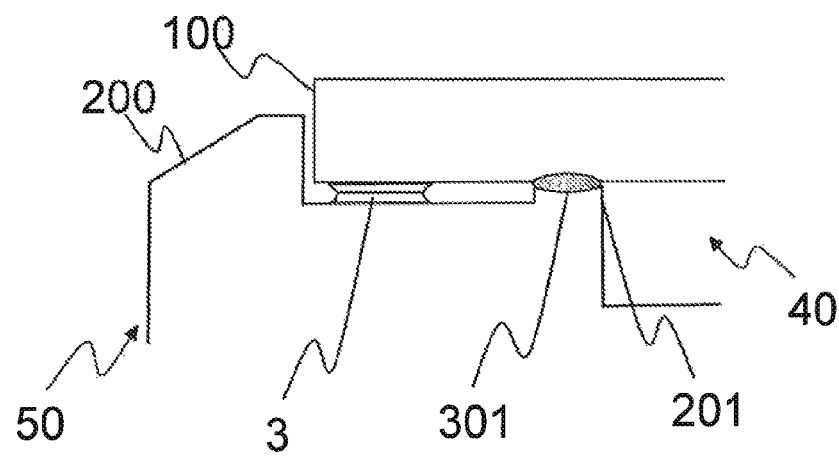
FIG. 3 is another example showing the bonded shapes through an adhesive in addition to the welded shapes in the periphery of a circuit chamber between the housing and the cover of a flow sensor embodied in the present invention.
Figure 4:
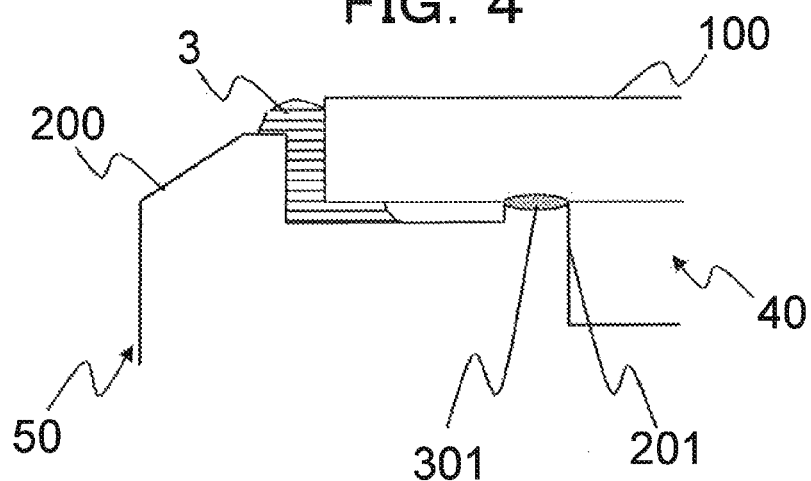
FIG. 4 shows another example of the flow sensor shown in FIG. 3.

Moreover, the section requiring air-tightness is defined as the first welded section 301 and the second welded section 302 as shown in FIGS. 1 and 2 having a larger gap and requiring no air-tightness or in which the percentage by which air bubbles (voids) are remained is high can be replaced with an adhesive 3 as shown in FIG. 3. For the adhesive 3 in use for that purpose, a thermally curable epoxy based adhesive and a silicone type adhesive curable with moisture are effectively adopted. Further, as shown in FIG. 4, productivity enhances with fillet of brazed joint formed and an adhesive curable with ultraviolet rays in use. In this case as well, the adhesive type concurrently thermally curable and curable with moisture is effectively adoptable.

Further, for the materials of the cover and the housing, thermoplastic resins are often adopted, but it often happens that the resins are subjected to heating treatment (annealing) under the temperature equivalent to glass transition temperature or higher in order to release residual stress during molding and improve on dimensional stability. In the case of a flow sensor according to the present example, the cover is thin and its rigidity is low, so that its dimensional change affecting the flow sensor is minor whereas the housing is thick and higher in rigidity, so that its dimensional change affecting the same is large in the state where the cover and the housing are welded to each other. Thus, it is preferred that annealing be performed for the housing before it is welded. However, providing that a PBT resin is adopted for the material of the housing and annealing is performed thereon during several hours under the temperature of 140 degrees Centigrade, the additives contained in the PET resin are precipitated or C=O groups exposed on the surface of the PBT resin are sank into molecules so as to make a weak boundary layer (WBL) formed. The problem with such case lies in the fact that laser welding or adhesiveness is aggravated. Thus, as the result that the relationship between a gap between the cover and the housing and welding strength has been examined, it has been found by the present inventors that according as a gap between the cover and the housing enlarges, the degree to which welding strength lowers is enhanced. Thus, it is preferred that surface treatments such as plasma processing, corona processing, UV ozone processing, laser processing and chemical processing by way of some examples be performed on the housing at least subjected to annealing so as to render such weak boundary layer removed. Such surface treatments are very effective because it causes the functional groups such as C=O groups to be increasingly generated, so that according as surface energy is enhanced, welding strength further improves. It is preferred that such treatments be performed on the housing even when annealing might not be performed thereon and unless there is restriction in the aspect of cost. Further, in the case of laser welding method, the resin from which the housing is made is fused and spread and then the resin from which the cover is made is fused so as to be welded to each other. Thus, where the surface energy of the housing is too large, such problem occurs as the fused resin of the housing being hard to be spread into the cover. Thus, when such surface treatments are performed on the housing, preferably, it is preliminarily arranged such that the surface energy of the cover at its fusing point is larger than that of the housing at its fusing point.

EXAMPLE 2

Figure 5:
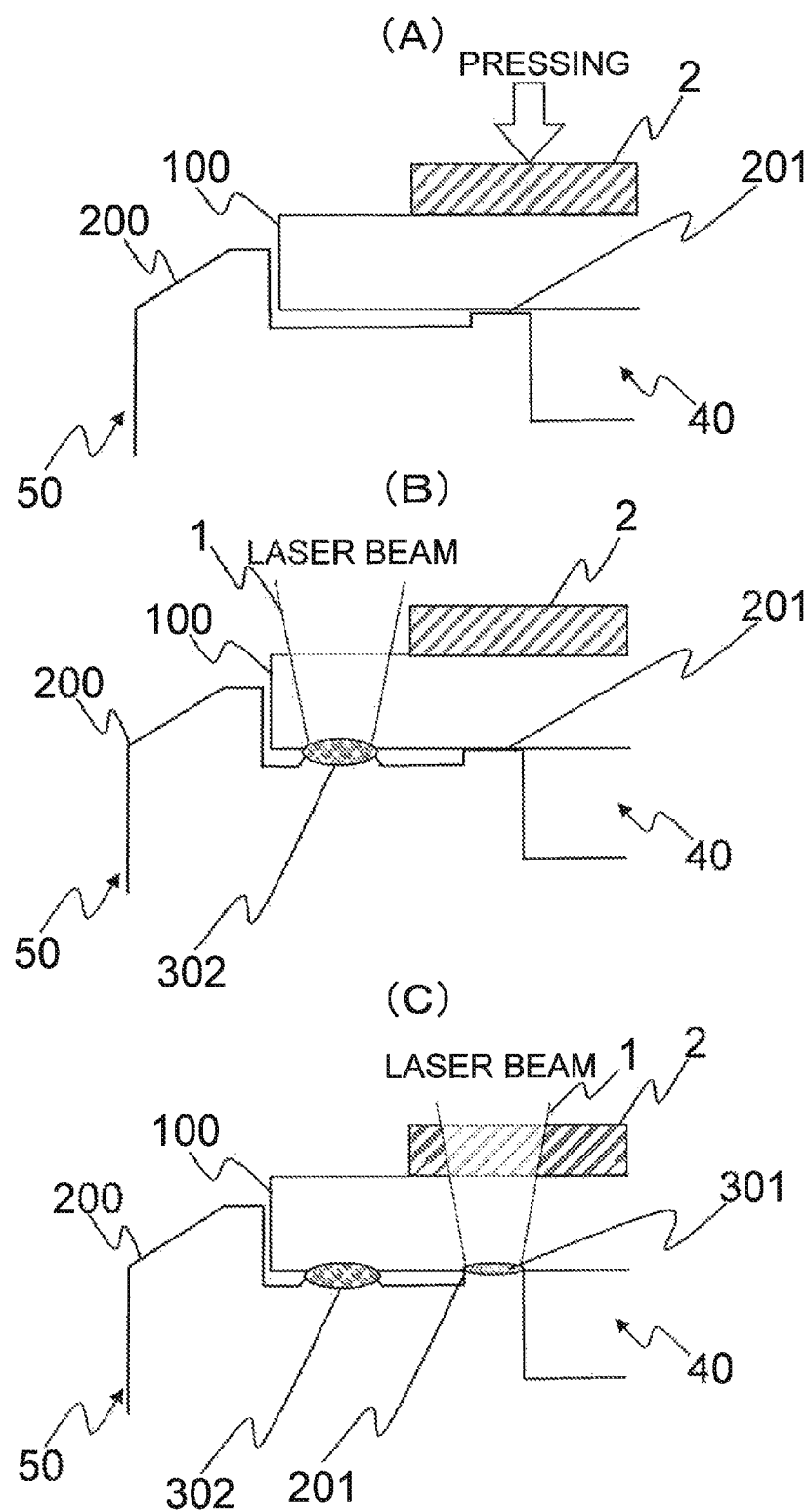
FIG. 5 is another example showing the welded shapes in the periphery of a circuit chamber between the housing and the cover of a flow sensor embodied in the present invention and the manufacturing processes thereof.

FIG. 5 is a cross-sectional view showing another example of a flow sensor and the manufacturing method thereof. Normally, in the case of laser welding, after the cover 100 and the housing 200 are pressed with a transparent press member made from glass or acrylic resin and as such so as to make the gap between them as narrow as possible, laser radiation is applied through the press member 2. However, transmittance of a PBT resin exemplified herein is low so that laser power must be relatively intensified. Moreover, it often happens that the thickness of the cover 100 ranges from 0.5 mm to 1.5 mm, so that laser beam of high power density is radiated not only onto the welded sections, but also onto the surface of the press member 2 with which the cover 100 is pressed. Thus, where there happen to be extraneous matters not to be bonded to the cover 100 on the surface onto which the laser radiation is applied, such extraneous matters are carbonized when laser radiation is applied to the cover 100, with the result that it often happens that the press member 2 inclusive is deteriorated. In this case, it requires that the press member 2 be laboriously replaced with a new one or cleaned.

Thus, as shown in FIG. 5, preferably, in the state where the gap H1 between the cover 100 and the convex portion 201 of the housing 200 is pressed with the press member 2, laser welding is performed on the weld target stepped portion 202 (or the gap H2) larger than the gap H1 and then laser welding is performed on the gap H1 after the press member 2 is removed. Such arrangement allows the second welded section 302 to effectively function as the press member 2.

As mentioned earlier, the sealing portion at the first welded section 301 requires air-tightness, so that it is essential that a gap between the cover and the housing should be as narrow as possible, but even when there happens to be a certain gap between them, there is no case where welding strength might deteriorate. Accordingly, in this example, laser radiation is not applied to the press member 2, so that it does not need to be transparent and the present arrangement prevents the press member 2 from being deteriorated or damaged. In view of the foregoing, the present example is very effective to reduce production cost and improve on productivity.

Figure 6:
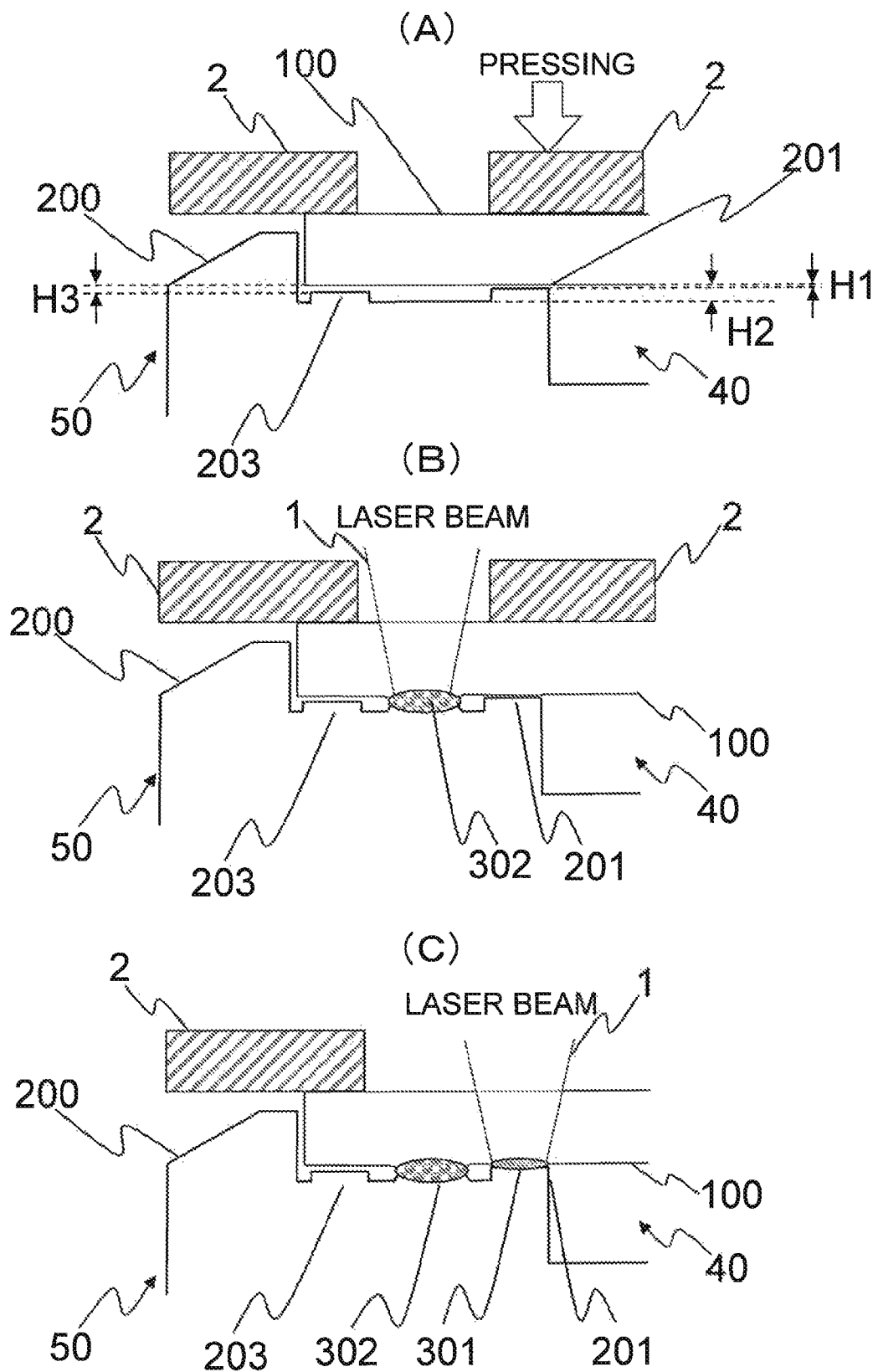
FIG. 6 is another example showing the welded shapes in the periphery of a circuit chamber between the housing and the cover of a flow sensor embodied in the present invention and the manufacturing processes thereof.

FIG. 6 is a cross-sectional view showing a modified example of a flow sensor according to the present invention and the manufacturing method thereof. This modified example is characterized in that in the housing 200, another convex portion 203 lower in height than the convex portion 201 forming the first welded section 301 having a sealing function is provided and such another convex portion inclusive is pressed with the prey member. Such arrangement allows the portion where the second welded section 302 is formed to be uniformly pressed. Hereupon, by way of one example, it is preferred that the gaps H1, H2 and H3 be designed as 0 μm, 50 μm and 25 μm respectively on the mold, but according to the shape of the actually prepared housing 200, it may well be arranged such that H2 is larger than H3 and H1, and H3 is larger than H1.

Hereupon, by way of one example, it is preferred that the gaps H1, H3 and H2 be designed as 0 μm, 0 μm and 50 μm respectively on the mold, but as for the actually prepared housing 200, according to its shape in light of sink marks and warps, it may well be arranged such that H2 is larger than H3 and H1, and H3 is larger than H1. However, the gaps H3 and H1 arranged in this order correspond to numeric values at their largest gap portions.

EXAMPLE 3

Figure 7:
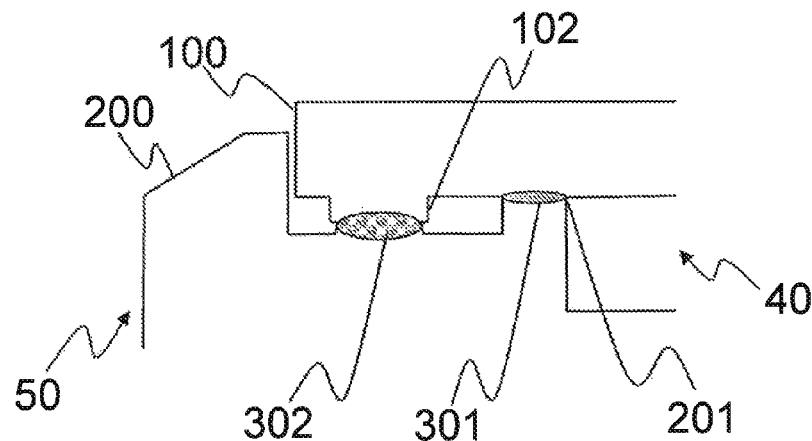
FIG. 7 is another example showing the welded shapes in the periphery of a circuit chamber between the housing and the cover of a flow sensor embodied in the present invention.

FIG. 7 is a cross-sectional view showing another example of a flow sensor according to the present invention and the manufacturing method thereof. As for the structure adopted in the present example, it is essential that the outer second welded section 302 is arranged robustly such that its bonding strength is less affected by the gap. The thicker the cover 100 becomes, the more the cover is affected by beam scattering and absorption, so that its transmittance lowers. On the other hand, according as beam absorption and scattering proceed, thermal expansion occurs on the resin from which the cover 100 is made, so that it has been found that the thicker the cover 100 becomes, the less its boding strength can be affected by the gap. Thus, making only the outer convex portion 102 of the cover 100 thicker enables its bonding strength to be more robust against the gap distance at the cover 100.

Figure 8:
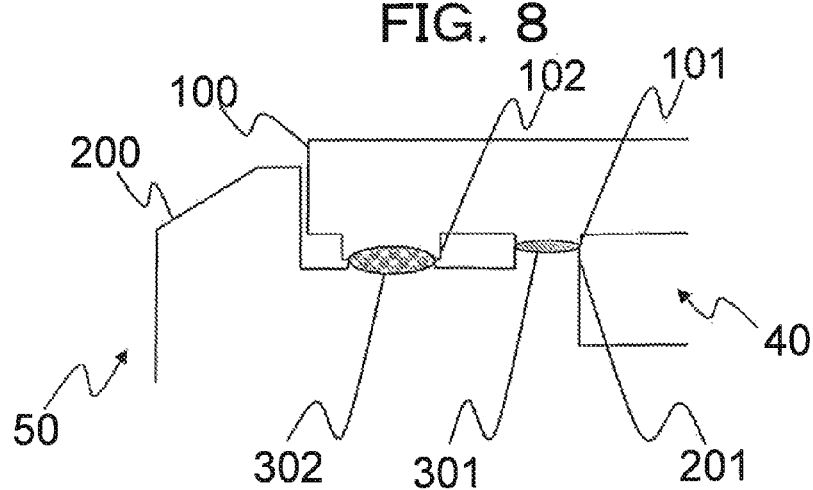
FIG. 8 is another example showing the welded shapes in the periphery of a circuit chamber between the housing and the cover of a flow sensor embodied in the present invention.

On top of that, when the cover 100 is large in thickness, the rigidity of the cover 100 also improves, which leads to effectively retraining the housing 200 from being deformed in the long run, with the result that the structure according to the present example is excellent in reliability. Further, as shown in FIG. 8, providing a convex portion 101 on the cover 100 allows a first welded section 301 far excellent in widthwise precision to be formed.

Figure 9:
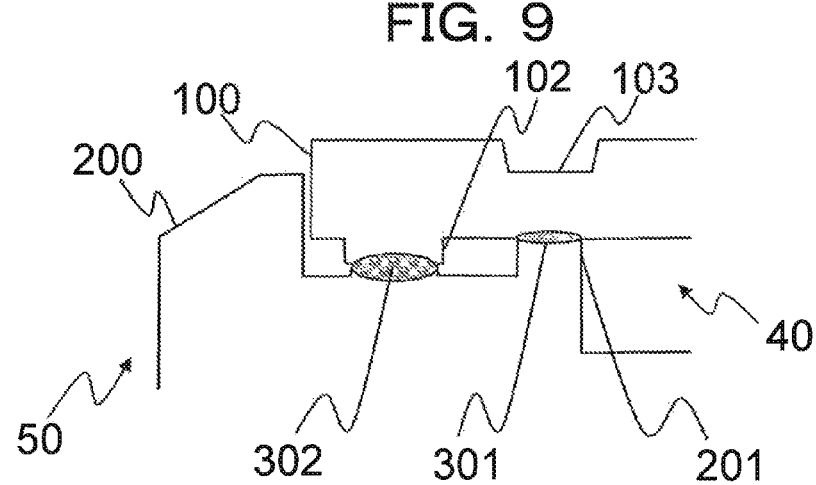
FIG. 9 is another example showing the welded shapes in the periphery of a circuit chamber between the housing and the cover of a flow sensor embodied in the present invention.

On the other hand, preferably, upon the first welded section 301 having a sealing portion being formed, the cover 100 may thin by providing a concave portion on the side surface of the cover 100 opposed to that where it is welded, as shown in FIG. 9. According to the present structure, upon the first welded section 301 being formed, it allows the portions through which laser beam transmits to be pressed with a transparent press member 2 and prevents the press member 2 from being deteriorated. On top of that, the present structure is favorable in light of improving productivity. To note, it may well be arranged such that as for the portion corresponding to the second welded section 302 as well, a concave portion is provided on the side surface of the cover 100 opposed to that where it is welded.

EXAMPLE 4

FIG. 10 is a cross-sectional view showing another example of a flow sensor according to the present invention and the manufacturing method thereof. The present structure is characterized in that a concave portion is also provided on the housing 200, which portion interposes the convex portion 102 of the cover 100 enlarged in thickness shown in FIG. 7. The problem with laser welding performed in the state where a gap between the cover and the housing is large normally lies in the fact that the laser beam absorbing housing 200 is excessively heated and subjected to thermal decomposition so as to readily cause burrs on the resin from which the housing is made. Thus, the present structure enables the portions where burrs occur to be restricted to the concave portion 206 of the housing 200. Further, such concave portions can be utilized for positioning the cover 100 against the housing 200. Furthermore, burrs form fillet so that the present structure is very effective for mitigating stress and improving welding strength.

FIG. 11 shows a modified example of the structure shown in the FIG. 10, in which a sloping is provided at both sides of the concave portion 206 of the housing 200. Using laser beam having a larger width size than a width size of the convex portion 102 formed on the cover 100 permits the intensity distribution of the laser beam to be changed so that the volume of fillet of brazed joints comprising burrs can be enlarged.

FIG. 12 shows a modified example in which a convex portion 101 is provided also in the cover 100 at the first welded section 301 forming the air-tight sealing portion and a concave portion 205 is provided also in the housing 200. Such arrangement restrains burrs from creeping on the inside of the circuit chamber 40 even when the gap provided for forming the first welded section 301 corresponding to the air-tight sealing portion might result in being relatively large in dimension. Further, in the same way as the structures shown in FIGS. 10 and 11, welding strength can improve by way of fillet of brazed joints.

FIG. 13 is a cross-sectional view showing a modified example of a flow sensor according to the present invention and the manufacturing method thereof. It is exemplified above that the concave portions 205 and 206 are structurally provided in the housing 200, but in light of moldability, according to the shape of the housing 200, it often happens that dimensional precision is bettered when the welded section at the housing 200 is formed into a convex shape or made flat. In such case, a concave shape 104 which prevents burrs from occurring may well be provided on the cover 100.

EXAMPLE 5

Figure 15:
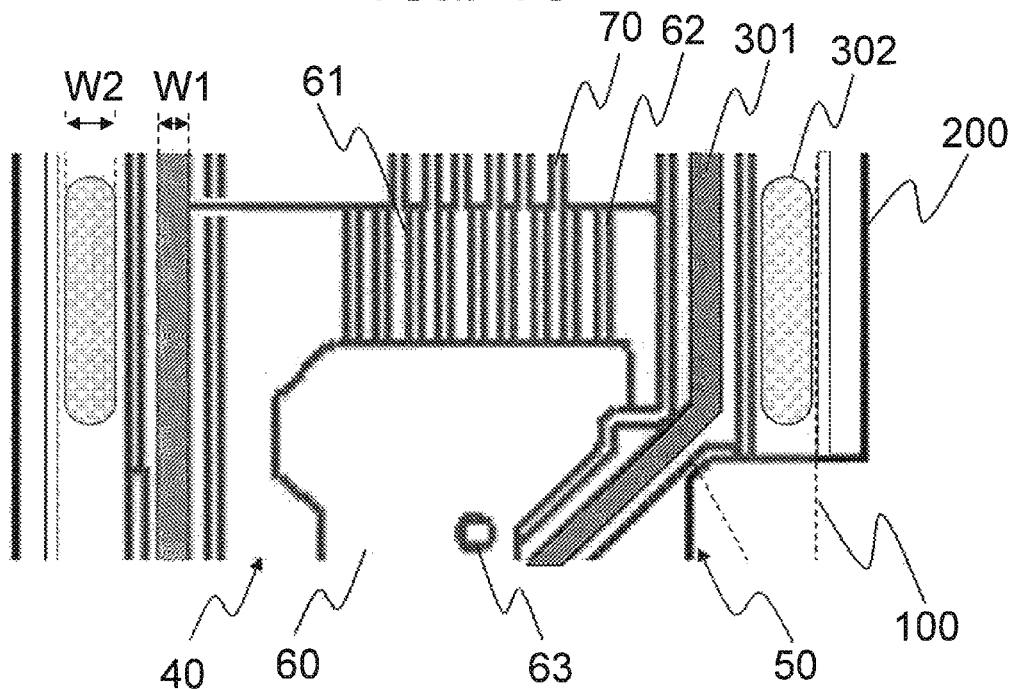
FIG. 15 is an example showing the structure of a flow sensor embodied in the present invention in the periphery of a circuit chamber when the laser welding method is applied.

FIG. 15 shows a top view of the circuit chamber 40 and its surrounding which illustrates another example of a flow sensor according to the present invention and the manufacturing method thereof. Within the circuit chamber 40, a circuit package 60, which incorporates detection circuits for a flow rate detection section to measure a flow rate of a gas to be measured flowing through a main channel and a temperature detection section 64 to measure a temperature of a gas to be measured flowing through the main channel, is disposed. The circuit package 60 is molded from an epoxy resin and as such and is provided with a coupling terminal 61 and a terminal 62. The coupling terminal 61 is bonded to an external coupling terminal 70 by welding. FIG. 15 shows an example in which at least two or more outer second welded sections 302 requiring no air-tightness are formed on the weld lines against the first welded section 301 to seal the circuit chamber 40. In order to seal the circuit chamber 40 at the first welded section 301, the entire periphery of the circuit chamber 40 is welded, so that in light of productivity, it is required that welding be performed with speed as high as possible. Thus, in order to prevent thermophoresis, it is preferred that the width W1 of the first welded section 301 be substantially the same as the laser radiation width. On the other hand, the second welded section 302 requires no sealing function, so that the welded section may well be locally selected. As with the outer second welded section 302, it is subjected to large stress concentration, in which the percentage by which air bubbles (voids) are remained is high, so that it is preferred that laser power be enhanced so as to enlarge its welded width or intensify its welding strength. Thus, the relationship between the width W2 of the second welded section 302 and that W1 of the first welded section 301 may well be defined as W2 being larger than W1.

Figure 16:
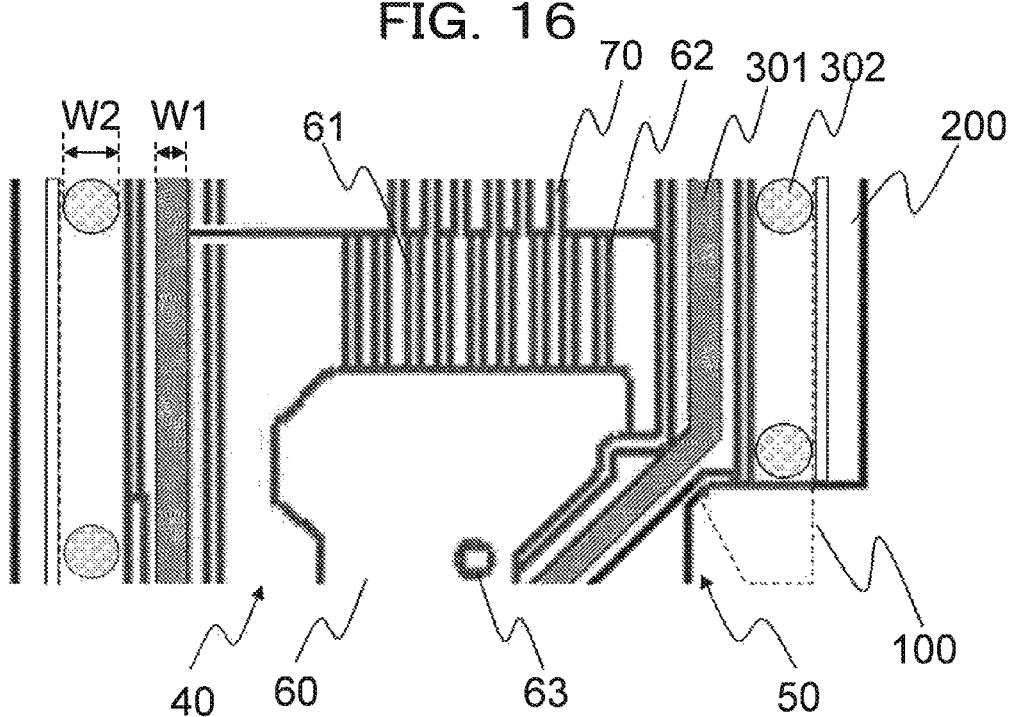
FIG. 16 is an example showing the structure of a flow sensor embodied in the present invention in the periphery of a circuit chamber when the laser welding method is applied.

Further, as with the second welded section 302, as shown in FIG. 16, it may well be spottedly welded. In particular, when it is spottedly welded, it can be welded by laser radiation of the order of ms, so that the second welded section 302 can be formed constantly with high speed. Accordingly, the present laser welded structure is very excellent in productivity. Further, laser welding is spottedly performed on the second welded section according to the present example, so that the present structure has a merit in that a larger welded section can be formed with lower laser power than when laser radiation is applied to the weld lines. To make the most of such merit, it is preferred that the spot width of the second welded section 302 be larger than the width of the first welded section 301. With reference to FIG. 16, the spot-shaped second welded sections 302 are formed at four spots outside the circuit chamber 40, but it is essential that such spot-shaped second welded sections are formed in two points or more outside the circuit chamber 40 with the circuit chamber interposed between them. Moreover, such spot-shaped second welded sections may well be formed not only outside the circuit chamber 40, but also only inside the chamber or both outside and inside the chamber.

EXAMPLE 6

FIG. 17 is the entire frontal view of the flow sensor with its cover (whose outer configuration is shown with a broken line) removed when the laser welding method according to the present invention is applied. Further, FIG. 18 is the entire backside view of the flow sensor with its cover (whose outer configuration is shown with a broken line) removed when the laser welding method according to the present invention is applied. FIGS. 17 and 18 show the first and second welded sections 301 and 302 with the cover 100 seen through. The housing 200 has a structure such that its measuring section extends from a flange 260 to the center direction of the main channel and at the tip end side thereof auxiliary channel grooves 251 and 253 to form an auxiliary channel are provided. In the present example, the auxiliary channel grooves 251 and 253 are provided on the front and back sides of the housing 200, in which the auxiliary channel groove 253 on the front side thereof is shown in FIG. 17 while that 251 on the back side thereof is shown in FIG. 18. An inlet groove 250 to form an inlet 250 of the auxiliary channel and an outlet groove 252 to form an outlet thereof are provided at the tip end section of the housing 200, so that a gas existing in the space apart from the inner wall surface of the main channel or the gas flowing through the space near the middle section of the main channel can be taken in from the inlet as a gas to be measured. It often happens that the gas flowing in the vicinity of the inner wall surface of the main channel is affected by the wall surface temperature of the main channel and has a temperature different from the average temperature of the gas such as intake air flowing through the main channel. Further, it often happens that the gas flowing in the vicinity of the inner wall surface of the main channel has a flowing speed slower than the average flowing speed of the gas flowing through the main channel. The flow sensor 50 according to the present example is not subjected to such phenomena, so that it can restrain the precision with which the flow rate is measured from deteriorating. As shown in FIGS. 17 and 18, not only the first and second welded sections 301 and 302, but also a third welded section 303 is provided for the channel section. In many cases, the third welded section 303 does not require air-tightness, so that the percentage by which air bubbles (voids) are remained therein may well be somewhat higher than that of the first welded section 301. It is preferred that the gap distance H4 between the cover 100 and the housing 200 when they are welded to each other be defined as follows: H2 is larger than H3, H4 and H1; H3 is larger than H4 and H1; and H4 is equal to or larger than H1. To note, according to the structure embodied in the present example, the circuit chamber 40 is completely separated from the channel section, but they may well be partly overlapped, in which case the overlapped section results in being the first welded section 301. Moreover, the structure embodied in this example is non-symmetrical, so that deformations such as warps often happen. Thus, it is preferred that the second welded section 302 be provided on the channel side as well. On top of that, there is provided a flange 260 according to the present structure, so that there are some cases where the sections of the housing 200 and the cover 100 to be pressed in the vicinity of the flange 260 might not be uniformly pressed. Thus, it is preferred that the second welded section 302 be provided on the flange 260 side as far as circumstances permit.

The above examples are separately explained, but they are not unrelated to one another. It shall be appreciated that any one of those examples is related as a modified example to any other of them.

REFERENCE SIGNS LIST

1 . . . laser beam,
2 . . . press member,
3 . . . adhesive,
10 . . . intake pile line,
20 . . . intake air,
40 . . . circuit chamber,
50 . . . flow sensor,
60 . . . circuit package,
61 . . . coupling terminal,
62 . . . terminal,
63 . . . trace of press,
64 . . . temperature detection section,
65 . . . heat transfer surface exposure section,
66 . . . trace of press,
67 . . . flow passage surface for measurement,
68 . . . Au bonding wire,
69 . . . flow sensor element,
70 . . . inner end of external terminal,
100 . . . cover,
101 . . . cover convex portion,
102 . . . cover convex portion,
103 . . . cover concave portion,
104 . . . cover concave portion,
105 . . . cover concave portion,
200 . . . housing,
201 to 203 . . . housing convex portions,
205 and 206 . . . housing concave portions,
250 . . . inlet groove,
251 . . . backside auxiliary channel groove,
252 . . . outlet groove,
253 . . . frontal side auxiliary channel groove,
260 . . . flange,
261 . . . abutment section,
262 . . . external coupling section,
301 . . . first welded section,
302 . . . second welded section,
303 . . . third welded section.

The invention claimed is:

1. A flow sensor comprising:
a laser beam absorbing resin housing that accommodates an auxiliary channel having an opening into which a fluid to be measured is taken, a sensor element that is disposed in the auxiliary channel and that measures a flow rate of the fluid to be measured and electronic parts that are isolated from the auxiliary channel in a circuit chamber and drive and detect the sensor element; and
a laser beam transmitting resin cover that is joined to the housing and that seals the circuit chamber in an air-tight manner from an atmospheric air,
wherein junctions of the housing and the cover are formed in locations where first target weld portions on a bonding surface of the housing and on a bonding surface of the cover of a first welded section face each other, the first welded section being formed so that the circuit chamber is surrounded, and second target weld portions on the bonding surface of the housing and the bonding surface of the cover of a second welded section face each other, the second welded section being disposed for restraining stress concentration on the first welded section reinforcement of joints, with a step provided such that a gap between the second target weld portions is larger than a gap between the first target weld portions; and the housing and the cover are set in position, thereby the first target weld portions and the second target weld portions being welded to each other by way of laser radiation.

2. The flow sensor according to claim 1,
wherein the first welded section formed by welding the first target weld portions to each other is formed such that it surrounds a periphery of the circuit chamber and the second welded section formed by welding the second target weld portions to each other is formed in at least two spots such that the second welded sections interpose the circuit chamber.

3. The flow sensor according to claim 2,
wherein the second welded section is linearly or spottedly formed.

4. The flow sensor according to claim 2,
wherein a width of the second welded section is larger than a width of the first welded section.

5. The flow sensor according to claim 1,
wherein the second welded section in which the second target weld portions are joined welded to each other is formed on a flange side.

6. The flow sensor according to claim 1,
wherein a projection to form one of the first and second target weld portions is provided or projections to form the first and second target weld portions are provided in one of the cover and the housing.

7. The flow sensor according to claim 6,
wherein a concave portion is formed on the target weld portions of one of the cover and/or the housing, and the junctions of the cover and the housing are formed with laser radiation applied to at least some of the target weld portions with mounted to each other.

8. The flow sensor according to claim 6,
wherein a projection at which the cover makes into no contact with the housing is provided in a vicinity of the projection to form one of the first and second target weld portions.

9. The flow sensor according to claim 1,
wherein a concave portion to make a thickness of the cover partly thinner through which a laser beam transmits is formed at a section of the cover where one of the first and second weld target portions is formed.

10. The flow sensor according to claim 1,
wherein a thickness of the cover around the region where the second target weld portion is formed is greater than a thickness of the cover around the region where the first target weld portion is formed.

11. The flow sensor according to claim 1,
wherein a laser beam transmittance of the cover around the region where the second target weld portion is formed is smaller than a laser beam transmittance of the cover around the region where the first target weld portion is formed.

12. The flow sensor according to claim 1,
wherein a third welded section is formed around the auxiliary channel.

13. The flow sensor according to claim 1,
wherein an amount of glass fibers contained in a thermoplastic resin from which the housing is made is greater than an amount of glass fibers contained in a thermoplastic resin from which the cover is made.

14. The flow sensor according to claim 1,
wherein a degree of crystallinity of the thermoplastic resin from which the housing is made is larger than a degree of crystallinity of the thermoplastic resin from which the cover is made.

15. The flow sensor according to claim 1,
wherein the first and second target weld portions formed in the locations where they face each other on the bonding surface of the housing and the bonding surface of the cover respectively are formed such that the gap between the first target weld portions is 75 μm or narrower whereas the gap between the second target weld portions is 150 μm or narrower when the housing and the cover are set in position so as to be pressed.

* * * * *